United States Patent [19]

Tauber

[11] Patent Number: 5,402,853
[45] Date of Patent: Apr. 4, 1995

[54] WEED DIGGER

[76] Inventor: Robert M. Tauber, 7823 W. Winona, Norridge, Ill. 60656

[21] Appl. No.: 103,533

[22] Filed: Aug. 6, 1993

[51] Int. Cl.6 .............................................. A01B 1/16
[52] U.S. Cl. .................................. 172/378; 294/50.8; 294/50.9; 172/375; 172/370; 172/25
[58] Field of Search ....................... 172/21, 22, 25, 41, 172/40, 44, 99, 370, 371, 372, 375, 378, 430, 720; 294/50.9, 50.8

[56] References Cited

U.S. PATENT DOCUMENTS

| | | | |
|---|---|---|---|
| 1,156,937 | 10/1915 | Sinnott . | |
| 2,266,677 | 12/1941 | Ing | 97/66 |
| 2,373,898 | 4/1945 | Kulesh | 254/132 |
| 2,594,598 | 4/1952 | Timmins | 294/51 |
| 2,642,305 | 6/1953 | Butler | 294/50.6 |
| 3,152,788 | 10/1964 | Hardwidge | 294/50.9 X |
| 3,282,567 | 11/1966 | Weniger | 294/50.9 X |
| 3,293,674 | 12/1966 | Sapia | 7/14.1 |
| 3,463,244 | 8/1969 | McFadden | 172/378 |
| 3,608,644 | 9/1971 | Ambrose | 172/378 |
| 3,767,251 | 10/1973 | San Filipo | 172/378 X |
| 3,847,226 | 11/1974 | Long | 172/371 |
| 4,476,939 | 10/1984 | Wallace | 172/375 X |
| 4,603,744 | 8/1986 | Ramirez | 172/25 |
| 4,618,003 | 10/1986 | Hostetter | 172/25 |
| 4,930,825 | 6/1990 | Dearman | 172/378 X |
| 4,964,472 | 10/1990 | Cleworth | 172/390 X |
| 5,060,997 | 10/1991 | Plecki | 294/50.6 |
| 5,109,930 | 5/1992 | Napier | 172/13 |

*Primary Examiner*—Randolph A. Reese
*Assistant Examiner*—Robert E. Pezzuto
*Attorney, Agent, or Firm*—Hill, Steadman & Simpson

[57] ABSTRACT

A weed puller which has a body portion with a tapered front surface. A weed digger blade is attached ot the bottom surface of the body portion and a top bracket is attached to the front tapered surface of the body portion. An ejector blade is mounted on a spring biased plunger and can be moved to eject a weed.

1 Claim, 1 Drawing Sheet

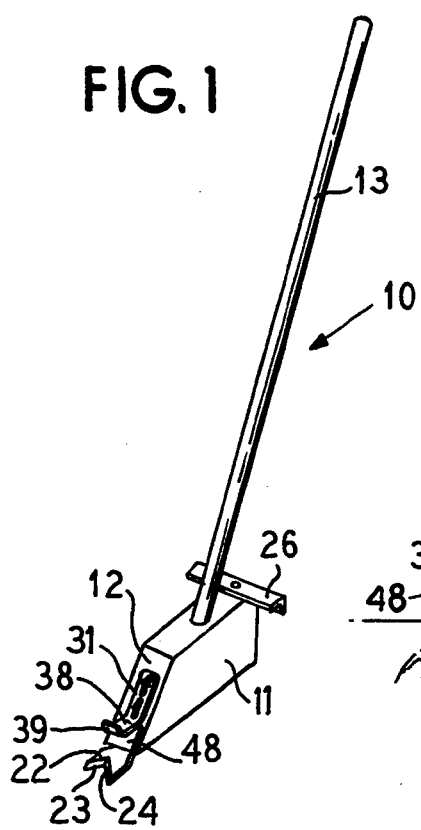
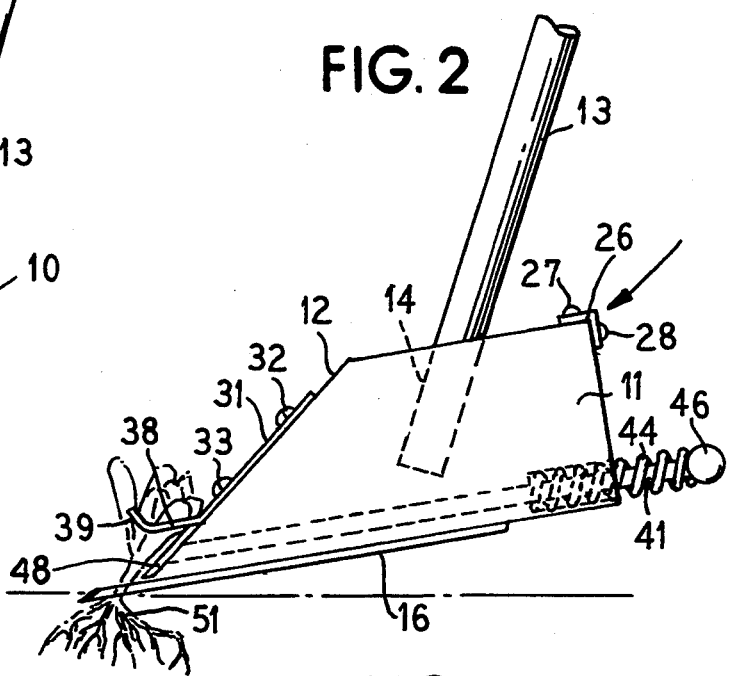
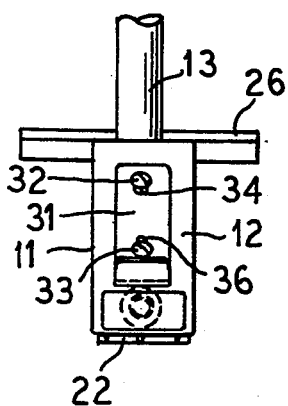
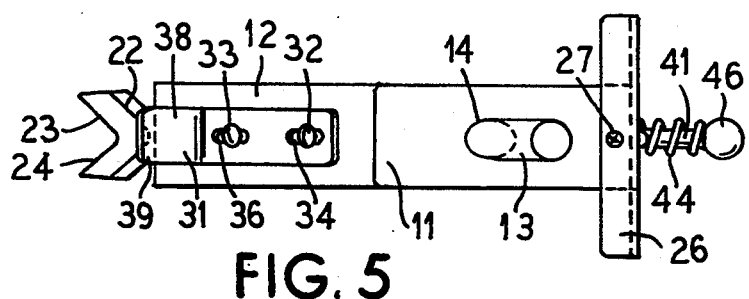
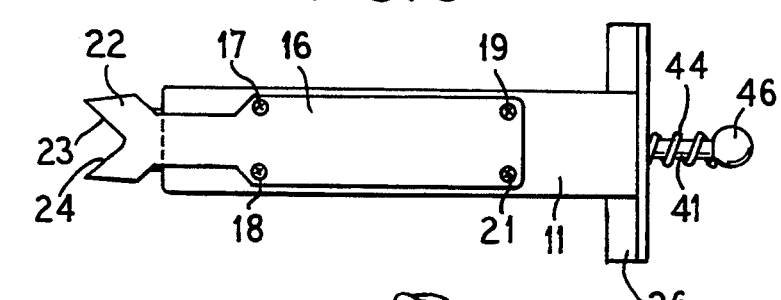
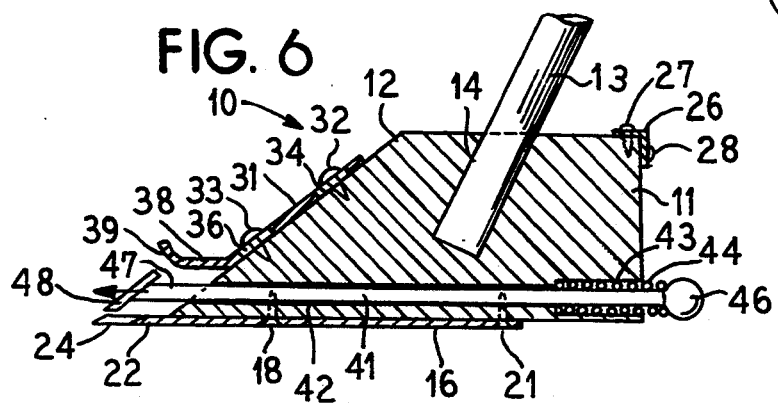

WEED DIGGER

BACKGROUND OF THE INVENTION

1. Field of the Invention

This invention relates in general to a weed digger and, in particular, to a weed digger which has a top bracket that engages the weed after it has been pulled to hold it to the weed digger and has an ejector for removing the weed from the weed digger after it has been pulled.

2. Description of Related Art

Weed diggers are known for inserting into the ground so as to engage and pull weeds. For example, see U.S. Pat. Nos. 2,373,898, 2,594,598, 2,642,305, 4,618,003, 3,293,674, 3,847,226, 2,266,677, 1,156,937, 5,060,997 and 5,109,930.

SUMMARY OF THE INVENTION

The present invention provides a novel weed digger which has a body portion with a front tapered surface. A weed digger blade is attached to the bottom of the body portion and a top bracket is attached to the front tapered surface of the body portion so as to engage and hold weeds after they have been dug by the weed digger blade. An ejector blade is mounted on a plunger which passes through an opening formed in the body portion and the plunger is spring biased so as to return the ejector to the initial position after the ejector has been manually moved to eject the weed.

A foot rest is attached to the body portion to allow the weed digger blade to be inserted into the ground to engage a weed.

The weed digger of the invention allows weeds to be engaged by the weed digger blade and removed by rotating the body portion with a handle. A top bracket engages the weed to hold it to the tool and an ejector blade mounted on a plunger allows the weed to be removed from the tool without the operator having to bend over to manually remove it from the tool.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of the weed digger of the invention;

FIG. 2 is a side plan view illustrating the weed digger in use;

FIG. 3 is a front elevational view of the invention;

FIG. 4 is a top elevational view of the invention;

FIG. 5 Is a bottom elevational view of the invention; and

FIG. 6 is a sectional view of the invention.

DETAILED DESCRIPTION OF THE PREFERRED EMBODIMENTS

The weed digger 10 of the invention is illustrated in the drawings, FIGS. 1-6 and comprises a body portion 11 which may be made of wood or other suitable material which has a front tapered surface 11. A handle 13 is inserted into an opening 14 formed in the body portion 11 as best shown in FIGS. 2 and 6.

A weed digger blade 16 is attached to the bottom surface of the body portion 11 by screws 17, 18, 19 and 21 or by other suitable holding means and has a cutter blade 22 which extends beyond the body member 11 and is formed with V-shaped cutting blades 23 and 24. A foot plate 26 is formed from angle iron, for example, and is held by screws 27 and 28 to an upper rear corner of the body member 11.

Above the cutter blade 22 of the weed digger blade 16 is mounted a top bracket 31 which is formed with slots 34 and 36 through which screws or other suitable holding means 32 and 33 are inserted so as to adjustably attach the top bracket 31 to the tapered portion 12 of the body portion 11. The lower end of the top bracket 31 is bent out to form a portion 38 generally parallel to the weed digger blade 16 and has an upwardly extending end 39 as illustrated. The top bracket 31 can be adjusted to different vertical positions by loosening the screws 32 and 33 and move the top bracket 31 so that the screws 32 and 33 move in the slots 34 and 36 after which they can be tightened to lock the top bracket 31 at the new adjusted position relative to the tapered surface 12 of the body portion 11.

An ejector blade 48 is attached to a plunger 41 mounted in an opening 42 of the body portion 11. An enlarged opening 43 surrounds the rear end of the plunger 41 and a spring 44 is mounted in the enlarged opening 43 and engages a ball 46 mounted on the end of plunger 42 so as to bias it to the right relative to FIGS. 2, 4, 5 and 6. The ejector blade 48 when retracted engages the tapered surface 12 as shown in FIG. 2 so that it does not interfere with weeds engaging the top bracket 31 so that they will be held to the weed digger in operation.

In use, the weed digger blade is inserted into the ground using the foot rest 26 and handle 13 until it engages a weed 51. Then the weed digger is rotated with the handle 13 so as to pull the weed 51 from the ground. The top bracket 31 engages the weed 51 so that it will be held as the weed digger 10 is raised. The ball 46 on the plunger 41 is used to move the ejector blade 48 to the position shown in FIG. 6 so as to eject the weed 51 from the weed digger into a suitable receptacle, for example.

When the ball 46 is released, the spring 44 returns the ejector blade 48 to the position shown in FIG. 2 so that the weed digger is ready for use. The top bracket 31 can be adjusted to different positions on the tapered surface 12 by loosening and tightening the screws 32 and 33 and moving the top bracket 31 relative to the screws 32 and 33.

It is seen that the present invention provides a new and novel weed digger which has a top bracket for holding weeds to the tool and ejector blade for removing weeds from the tool.

Although the invention has been described with respect to preferred embodiments, it is not to be so limited as changes and modifications can be made which are within the full intended scope of the invention as defined by the appended claims.

I claim as our invention:

1. A weed puller with an ejector comprising, a block-shaped body portion formed with parallel side surfaces and parallel top and bottom surfaces and a rear surface which lies in a plane normal to said top and bottom surfaces and to said side surfaces and a front surface which lies in a plane that makes an angle of ninety degrees with said side surfaces and an angle other than ninety degrees with said top and bottom surfaces, a handle attached to said body portion and extending generally upwardly from said top surface,

- a weed cutter formed with V-shaped cutter blades that extend outwardly from said front surface and said weed cutter attached to said bottom surface, a weed holding adjustable top bracket adjustably attached to said front surface of said body portion and having a lower end which extends outwardly from said front surface parallel to said bottom surface and above said V-shaped cutter blades,
- a foot plate attached to said top surface of said body portion,
- an opening formed through said body portion and extending from said rear surface to said front surface and extending parallel to said top and bottom surfaces,
- a plunger which has opposite ends that extend from said front and rear surfaces of said body portion movably mounted in said opening, an ejector attached to an end of said plunger which extends from said front surface of said body portion, said ejector mounted so as to be parallel to said front surface, and
- spring biasing means for biasing said plunger so that said ejector in a first position engages said front surface of said body portion and wherein said ejector can be moved to a second position against said spring biasing means out of contact with said front surface so as to eject weeds from said weed puller.

* * * * *